US010095885B1

United States Patent
Enderwick et al.

(10) Patent No.: US 10,095,885 B1
(45) Date of Patent: Oct. 9, 2018

(54) PRIVACY-PROTECTING INTER-USER DIGITAL COMMUNICATION MESSAGE SEARCH

(71) Applicant: Nacho Cove Inc., Bend, OR (US)

(72) Inventors: Thomas Jeffrey Enderwick, La Jolla, CA (US); Christopher Perret, Bend, OR (US); Stephen Scalpone, Portland, OR (US)

( * ) Notice: Subject to any disclaimer, the term of this patent is extended or adjusted under 35 U.S.C. 154(b) by 0 days.

(21) Appl. No.: 15/696,025

(22) Filed: Sep. 5, 2017

Related U.S. Application Data (62) Division of application No. 15/005,641, filed on Jan. 25, 2016, now Pat. No. 9,785,798.

(60) Provisional application No. 62/107,251, filed on Jan. 23, 2015.

(51) Int. Cl.
| | |
|---|---|
| G06F 21/62 | (2013.01) |
| G06F 17/30 | (2006.01) |
| H04L 29/06 | (2006.01) |
| H04L 29/08 | (2006.01) |
| H04L 12/58 | (2006.01) |

(52) U.S. Cl.
CPC .... *G06F 21/6263* (2013.01); *G06F 17/30477* (2013.01); *H04L 51/04* (2013.01); *H04L 67/22* (2013.01); *H04L 67/42* (2013.01)

(58) Field of Classification Search
None
See application file for complete search history.

(56) References Cited

U.S. PATENT DOCUMENTS

| | | |
|---|---|---|
| 8,375,089 B2 | 2/2013 | Todorov |
| 2004/0133564 A1 | 7/2004 | Gross et al. |
| 2006/0036696 A1 | 2/2006 | Maresh |
| 2006/0048224 A1 | 3/2006 | Duncan et al. |
| 2007/0208746 A1 | 9/2007 | Kolde et al. |
| 2011/0252023 A1 | 10/2011 | Santamaria et al. |
| 2013/0232204 A1 | 9/2013 | Barney et al. |
| 2016/0055143 A1 | 2/2016 | Goel et al. |

*Primary Examiner* — Benjamin E Lanier (57) ABSTRACT

Digital communication messages processed by each specific one of a plurality of client computers are tracked and indexed. A query made by a first client computer against a base of digital communication messages of the organization is received by the client computers. The indexed communication messages are searched based on the query, and a search result is obtained. Relevance between the query and the search result is determined. Users operating client computers are prompted to indicate whether to respond to the query responsive to determining that the relevance meets a criterion. An indication to respond to the query is received by one or more client computers of the plurality. One or more responses are generated by the one or more client computers and transmitted to the first client computer.

11 Claims, 8 Drawing Sheets

PRIVACY-PROTECTING INTER-USER DIGITAL COMMUNICATION MESSAGE SEARCH

CROSS-REFERENCES TO RELATED APPLICATIONS

This application is a divisional of U.S. application Ser. No. 15/005,641, filed Jan. 25, 2016, entitled Privacy-Protecting Inter-User Digital Communication Message Search, which claims the benefit of priority under 35 U.S.C. 119(e) to U.S. Application No. 62/107,251, filed Jan. 23, 2015, entitled Privacy-Protecting Inter-User Email Search, the contents of which are hereby incorporated herein by reference.

TECHNICAL FIELD

This disclosure pertains generally to information privacy protection, and more specifically to protecting user privacy when searching digital communication messages within an organization.

BACKGROUND

Currently, most organizations maintain one or more email servers, or contract with a service company that provides email server access. Email servers transport email both between members of the organization (e.g., corporate employees, university students and faculty, etc.) and between members of the organization and external email senders/receivers. Employees (or other organization members) use email clients running on their computing devices (e.g., desktop computers, laptop computers, smartphones, etc.) to access their emails. Examples are Microsoft Outlook on a Windows based PC or the iPhone mail client. Some parties use web-based email that directly accesses the mail server using a browser, however this is typically used to access email from a third party's computer, and exclusive use of web-based email clients is atypical.

A significant portion of an organization's stored information is in the form of email. This information can be in the body of emails, metadata concerning emails and/or files attached to emails. Information of interest can be explicit, such as content of emails and attachments, as well as records of sent what to whom at what time and the like. In addition, desired information can be in the form of implicit data that can be inferred from email content and history, such as the identity of specific parties with familiarity with a particular topic.

Conventionally, information embedded within an email message is only available to the sender and recipient of the message, or in some instances managers or email level administrators with the ability and authority to review the emails of others. This results in a situation in which most parties cannot leverage the information contained in the organization level email base, and to the extent to which this information can be accessed by a select few, the privacy of the email senders and recipients is not maintained.

Electronic communication messages within an organization in other formats (e.g., text messages, chat sessions, digitized voicemails, etc.) present similar challenges.

It would be desirable to address these issues.

SUMMARY

Queries are made against an organization's base of email or other forms of digital communication. User privacy is protected by enabling users to not respond, or to redact their responses to protect their identities or other sensitive information. Client computers within the organization track and index their processed digital communication messages. The digital communication messages can be in the form of email message (e.g., Simple Mail Transfer Protocol (SMTP)), or can be in other formats such as Short Message Service (SMS) messages, Multimedia Message Service (MMS) messages, digitized voicemail, etc. A client computer within the organization generates a query against the base of digital communication messages of the organization, and transmits the query to the plurality of client computers (either directly or through a centralized communication component). One or more client computers within the organization respond to the query, based on search result relevance and/or user consent.

The index of each client computer of the plurality is searched based on the query, generating a search result. If the relevance of a search result of a specific client computer meets a criterion, this specific client computer becomes a potential responder to the query. The search result relevance criterion ensures that any response to the query is sufficiently relevant. A potential responding client computer prompts its user to indicate whether to respond the query. If the user indicates "no," a response will not be generated even if the client computer could provide highly relevant information requested by the querying computer. By declining to respond based on this user consent criterion, the user can protect the privacy of information from the querying computer.

If the user indicates to respond, a response is generated and provided to the querying client. Thus, multiple responses from multiple clients can be provided to the query, thereby enabling searches against the organization's base of electronic communication. To further protect user privacy, users may elect not to include user identification information or the like in responses. In addition, specific data can be redacted from the search results used to generate responses to the querying computer, thereby preventing sensitive information from being exposed. Thus, information sharing is balanced with information privacy protection where desired.

In some embodiments, client computers may be compelled to respond to a query without consulting the corresponding users, for example in an emergency or a scenario in which the privacy expectation is low. Furthermore, in some embodiments, a query is sent to selected client computers that are statistically more likely to have relevant information and/or to respond to the query. In some embodiments, a centralized component such as a server handles query processing on behalf of some or all of the plurality of client computers.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that other embodiments of the structures and methods illustrated herein may be employed without departing from the described principles.

DETAILED DESCRIPTION

Figure 1:
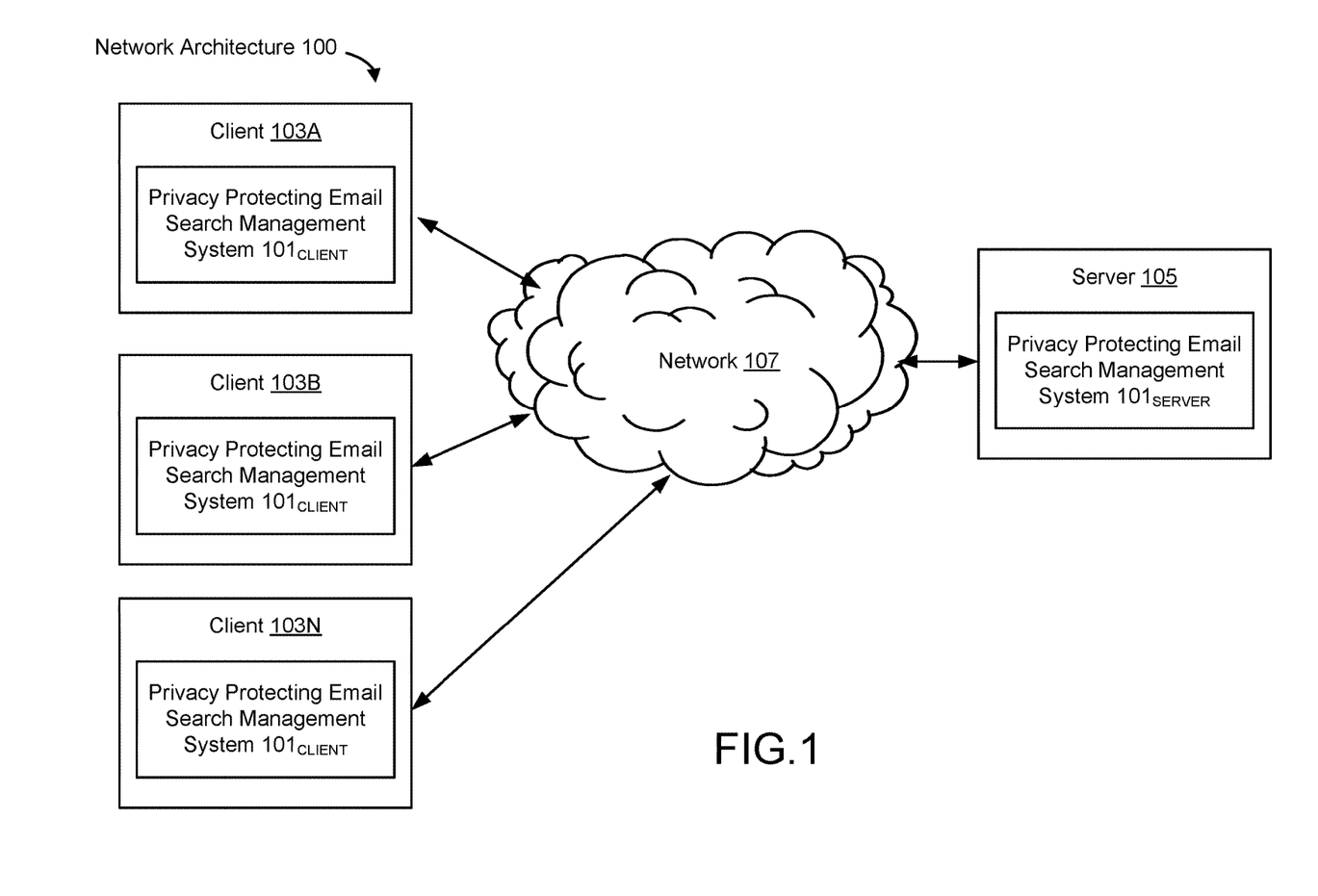
FIG. 1 is a block diagram of an example of a network environment suitable for the operation of a privacy protecting email search management system, according to some embodiments.

FIG. 1 is a block diagram illustrating an exemplary network architecture 100 in which a privacy protecting email search management system 101 can be implemented. The illustrated network architecture 100 comprises a server 105, which is depicted as being in the cloud such that applications running on the server 105 can be configured for access over a network 107 (e.g., a private intranet maintained by a corporation or other type of organization) as a service. FIG. 1 also illustrates multiple client computers 103A, 103B and 103N, communicating with the server 105 through the network 107. FIG. 1 illustrates a server component $101_{SERVER}$ of the privacy protecting email search management system 101 residing on the server 105, and a client component $101_{CLIENT}$ of the privacy protecting email search management system 101 residing on each client computer 103. It is to be understood that this is an example only, and in various embodiments various functionalities of the privacy protecting email search management system 101 run on a single computing device (e.g., a server 105) or can be distributed between multiple computing devices in other ways, including multiple servers 105 and/or client computers 103 as desired.

Although FIG. 1 depicts and the corresponding text describes a privacy protecting email search management system 101, it is to be understood that in other embodiments the components illustrated and the techniques described herein are applied to digital communication messages in formats other than email. For example, in different embodiments digital communication messages can include, but are not limited to, messages in the following formats: Short Messaging Service (SMS), Multimedia Messaging Service (MMS), Simple Mail Transfer Protocol (SMTP), digitized voice mail, etc. Thus, wherever the language "email" appears in the description, it is to be understood that the term "digital communication message" may be substituted, and in other embodiments digital communication messages in other formats are utilized.

In an email based embodiment, the server 105 typically provides conventional email server functionality in addition to the server side functionality of the privacy protecting email search management system 101 described herein. Likewise, the clients 103 typically provide conventional email client functionality in addition to the client side functionality of the privacy protecting email search management system 101. Client computers 103 can be in the form of desktop computers, laptops or other types of mobile computing devices, such as smartphones, tablets, wearable computing devices supporting email, etc. Typically, the client side of the privacy protecting email search management system 101 communicates with the server side through the network 107, and acts as a user operated frontend thereto.

Clients 103 and servers 105 can be implemented using computer systems 210 such as the one illustrated in FIG. 2 and described below. The clients 103 and server 105 are communicatively coupled to the network 107, for example via a network interface 248 as described below in conjunction with FIG. 2. Clients 103 are able to access applications and/or data on server 105 using, for example, a web browser or other client software (not shown).

Although FIG. 1 illustrates one server 105 and three clients 103A, 103B, 103N as an example, in practice many more (or fewer) of each of these components can be deployed or utilized as desired. In one embodiment, the network 107 is in the form of a private enterprise network. Other networks 107 or network-based environments can be used in other embodiments. It is to be further understood that the server 105 can communicate with computing devices outside of the network 107, such as email servers of other organizations, for example through the Internet.

As noted above, FIG. 1 depicts a client component $101_{CLIENT}$ of the privacy protecting email search management system 101 residing on each of multiple client computers 103, and a server component $101_{SERVER}$ of the privacy protecting email search management system 101 residing on a server computer 105. As described above, the functionalities of the privacy protecting email search management system 101 can be distributed between multiple computer systems 210, including within a cloud-based computing environment in which the functionality in question is provided as a service over a network 107. It is to be understood that although the client and server components $101_{SERVER}$ of the privacy protecting email search management system 101 are illustrated in FIG. 1 as single entities, these components represent collections of functionalities, which can be instantiated as a single or multiple modules as desired. It is to be understood that the modules of the privacy protecting email search management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" "mobile communication device" and "computing device" mean one or more computers configured and/or programmed to execute the described functionality. Additionally, program code to implement the functionalities of the privacy protecting email search management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

Server and client components can be in the form of applications written for various different target operating systems (e.g., Windows, Mac OS, Linux, etc.). A client side component can also be in the form of an iOS app for an iPhone, iPad, iPod touch or other similar mobile computing device, as well as apps written for a different mobile operating system, such as Android, Windows Phone, Blackberry OS, etc.

Figure 2:
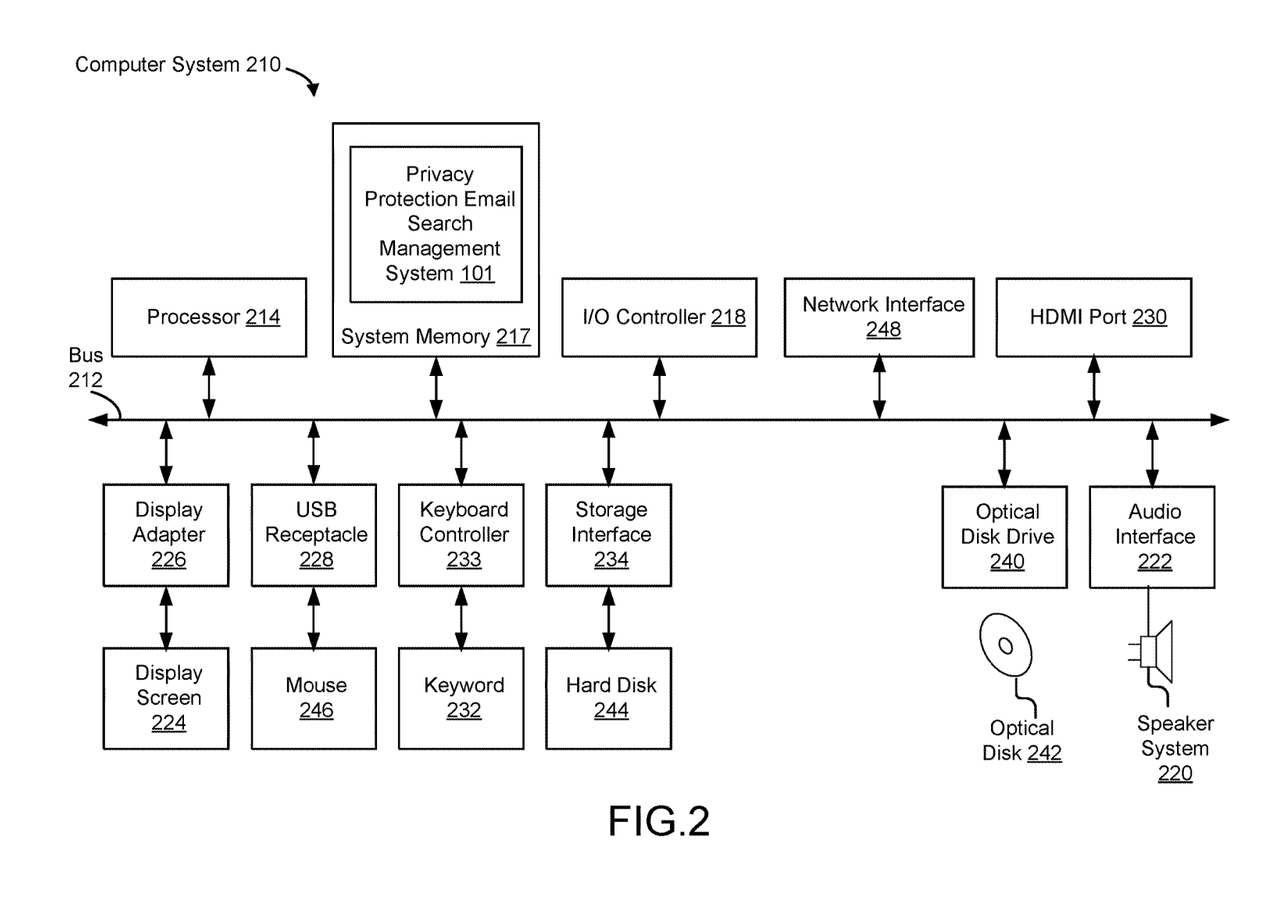
FIG. 2 is a block diagram of a computer system suitable for implementing a privacy protecting email search management system, according to some embodiments.

FIG. 2 is a block diagram of a computer system 210 suitable for implementing a privacy protecting email search management system 101. Client computers 103 (including mobile computing devices) as well as server 105 can be implemented in the form of such computer systems 210. As illustrated in FIG. 2, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as Universal Serial Bus (USB) receptacles 228, serial ports 230, etc., a keyboard controller 233 communicatively coupled to a keyboard 232, a storage interface 234 communicatively coupled to at least one hard disk 244 (or other form(s) of magnetic media), an optical disk drive 240 configured to receive an optical disk 242, a mouse 246 (or other pointing device) coupled to the bus 212, e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example, via the network interface 248 or modem 247. In FIG. 2, the privacy protecting email search management system 101 is illustrated as residing in system memory 217.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the Internet. Such coupling can be wired or wireless.

The client component $101_{CLIENT}$ of the privacy protecting email search management system 101 replaces or supplements a conventional "dumb" email client. The client component $101_{CLIENT}$ tracks the email that it has processed, and maintains an index of this data. As described in more detail below in conjunction with FIGS. 3 and 4, email users (e.g., employees) can issue queries against the organization's email information base that are broadcast to the client components $101_{CLIENT}$ of other users. When a given client component $101_{CLIENT}$ receives such a query, the receiving component can search its local index data, and determine the relevance of its search result (e.g., by calculating a relevance score). If the receiving client determines that the search results are sufficiently relevant to the query (e.g., if the score meets a given threshold), the email user of the receiving client component $101_{CLIENT}$ can be prompted as to whether s/he would like to respond to the query. If the user declines, then no response is made to the query, and the user's privacy is protected. If the user elects to respond, then a response is made which can include or omit the responding user's identity, and varying levels of email data as desired. How much and what information to include in a response can vary between embodiments.

Responses to queries can be transmitted to the client component $101_{CLIENT}$ that sent the query, and presented to the corresponding originating email user. By receiving responses from multiple client components $101_{CLIENT}$, the user can receive relevant information contained in the organization's email base that would not conventionally be available. Because users can decline to respond or limit the information contained in a response, privacy is maintained.

The client component $101_{CLIENT}$ of the privacy protecting email search management system 101 can be thought of as a smart email client that supersedes conventional email client functionality. Email users can utilize the client component $101_{CLIENT}$ to read, send, process and otherwise act on emails, just as a typical email client does. The client component $101_{CLIENT}$ also adds functionality specific to the privacy protecting email search management system 101. More specifically, the client component $101_{CLIENT}$ indexes email content, builds a keyword-based index and treats each email as a document. The body of each email is indexed, the attachments (if any) of the email are parsed and indexed, and metadata concerning the email (e.g., fields such as to, from, cc, bcc, time, date, priority status, etc.) are indexed. Conventional indexing tools and methodology can be used to implement this functionality.

The client component $101_{CLIENT}$ enables email users to enter queries, for example by operating a graphical user interface of the client component $101_{CLIENT}$. In another scenario, end-users can enter queries in other ways, for example via a web-based user interface. Note that in the latter case the end-users need not (but can) be an end-user of a smart client component $101_{CLIENT}$. In any of these cases, client components $101_{CLIENT}$ can process received queries, and provide users with the option to respond. A client component $101_{CLIENT}$ thus contains the logic to process a query request and to respond to a query request. A client component $101_{CLIENT}$ can also contain logic to deduplicate queries and responses, for example in a scenario in which a single user has more than one email client (e.g., one each on a desktop, tablet and smartphone). In this situation, inter-client communication can be used between the respective client component $101_{CLIENT}$ associated with the email user.

A query is communicated from the querying entity to the various client components $101_{CLIENT}$ of the multiple email users within an organization. In one embodiment, a centralized communication module 305 of the server component $101_{SERVER}$ of the privacy protecting email search management system 101 is used by all client components $101_{CLIENT}$ for this communication. This communication module 305 can be implemented on a single server 105 or a cluster of servers 105 behind a loadbalancer, combined with a server side database. In different embodiments, the functionality of the communication module 305 can be distributed between multiple computers as desired.

Multiple client components $101_{CLIENT}$ can submit queries to the communication module 305. In other embodiments, other forms of query submission may be supported, e.g. a web interface or REST API. A query typically consists of search terms paired with identity/contact information (for example, an email address) of the email user who created the query. The exact format of queries can vary between embodiments. In one embodiment, client components $101_{CLIENT}$ periodically connect to the communication module 305 and learn of submitted queries. Clients process these queries and, responsive to search result relevance and user consent, generate query responses. In one embodiment responses are emailed directly to the user who initiated the query, although in another embodiment responses can be transmitted through the communication module 305. In some embodiments, rather than using a centralized communication module 305, queries are transmitted directly from the originating client component $101_{CLIENT}$ to the other client components $101_{CLIENT}$, for example by broadcast email. In this scenario, the client components $101_{CLIENT}$ do not display inbound query request emails to the email user, but instead process the requests internally, hiding the email query requests using normal email display mechanisms. The receiving client components $101_{CLIENT}$ can then prompt users as to whether they wish to respond to queries for which relevant search results were found, as described above.

Figure 3:
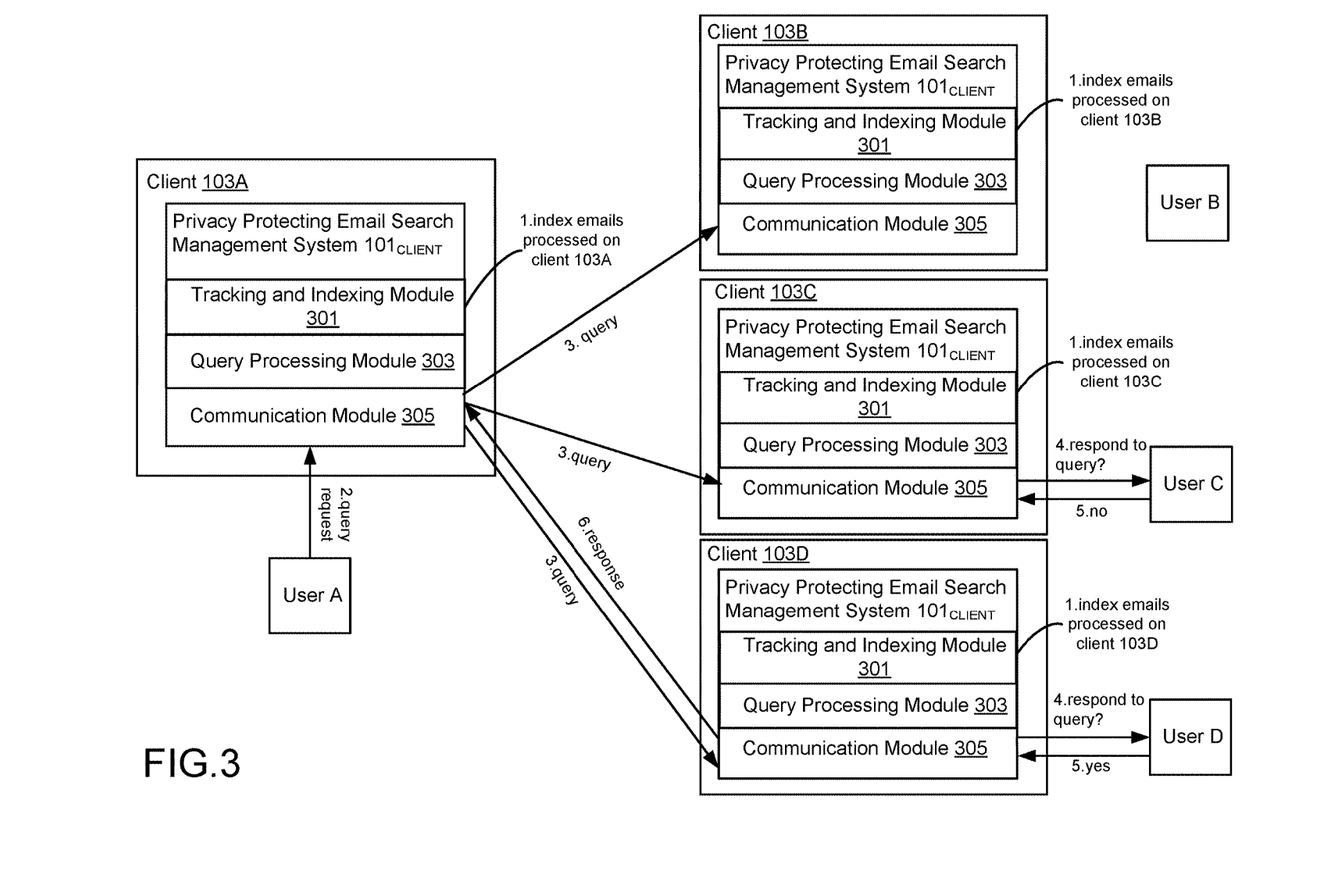
FIG. 3 is a block diagram of the operation of a privacy protecting email search management system including a plurality of client computers, according to some embodiments.

FIG. 3 illustrates the operation of a privacy protecting email search management system 101 including a plurality of client computers 103, according to some embodiments. In FIG. 3, an example query processing flow is described to help clarify the above-described functionality. The example includes four email users, email users A-D. In the example, each email user operates a client computer 103, i.e., client 103A, 103B, 103C or 103D. Each of the clients 103A-D includes a client component $101_{CLIENT}$ of the privacy protecting email search management system 101, which further includes a tracking and indexing module 301, a query processing module 303, and a communication module 305.

As illustrated in FIG. 3, the tracking and indexing module 301 residing on each of clients 103A-D builds and maintains an index based on the emails received, read, written, sent and otherwise processed by the corresponding user over time. Email user A creates and submits a query request to the client component $101_{CLIENT}$ on client 103A, and the query processing module 303 on client 103A generates a corresponding query. The communication module 305 on client 103A transmits the query to the client components $101_{CLIENT}$ on the client computers 103 operated by email users B, C and D (i.e., clients 103B-D). The query processing module 303 of email user B's client component $101_{CLIENT}$ computes a low search score by consulting its index. This client component $101_{CLIENT}$ does no further processing for this query request. The query processing module 303 of email user C's client component $101_{CLIENT}$ computes a high search score by consulting its index. This client component $101_{CLIENT}$ prompts email user C if s/he would like to respond. Email user C indicates "no," and client component $101_{CLIENT}$ does no further processing for this query request. The query processing module 303 of email user D's client component $101_{CLIENT}$ also computes a high search score by consulting its index. This client component $101_{CLIENT}$ prompts email user D if s/he would like to respond, and email user D indicates "yes." The client component $101_{CLIENT}$ on client 103D sends a response directly to email user A, using the communication modules 305 residing on clients 103A and 103D.

Figure 4:
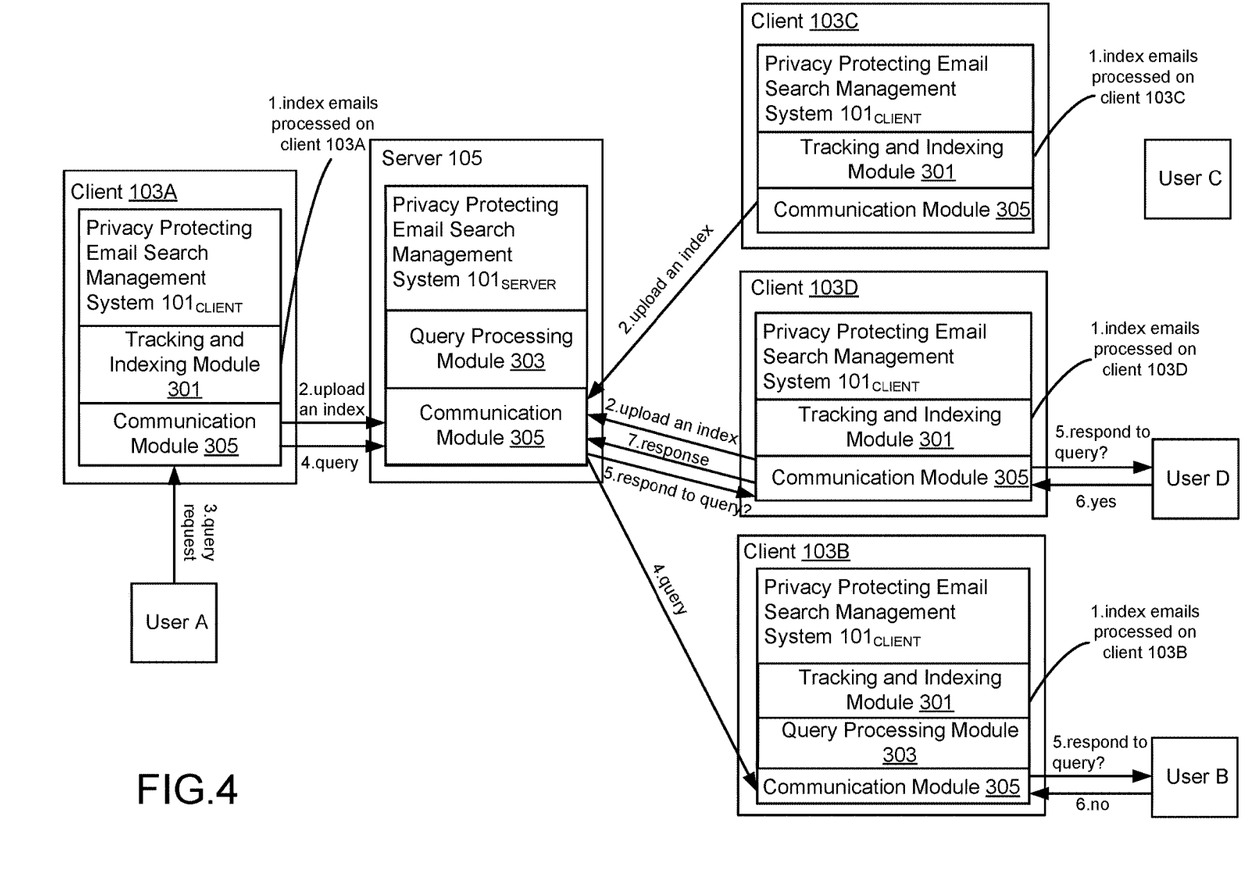
FIG. 4 is a block diagram of the operation of a privacy protecting email search management system including a server and a plurality of client computers, according to some embodiments.

Direct communication between clients 103 as shown in FIG. 3 is appropriate if there is no concern about disclosing the requester and responder identity. In a case where the requester and/or responder identity is to be concealed, a request and/or a response can be sent through a central communication module 305 residing on a server 105 (e.g., as illustrated in FIG. 4), which can forward the communication without providing the originating email user's identity to the recipient. For example, a response can be sent to email user A indirectly through a central communication module 305 residing on a server 105 as depicted in FIG. 4 and described below. The server side communication module 305 can transmit the response to email user A without revealing the responder's identity. In some embodiments, a broker functionality can be utilized in conjunction with the central communication module 305, determining when it is appropriate to allow transmission of information or identity between a requester and a responder. The broker can be algorithmic, or based on human entered input, such as directives from a manager or administrator.

In FIG. 3, the query processing module 303 on client 103D obtains a search result by consulting its index based on the query, and generates the response based on the search result. In addition to concealing or disclosing the user identity information in the response (e.g., via a communication module 305 residing on a server 105), client 103D can further select content from the search result to be included in and/or to be omitted from the response, thereby preventing sensitive information from being exposed. For example, information such as social security numbers, birth dates, home addresses, personal documents, etc., can be redacted from the response, based on, e.g., user directives.

The functionality of the privacy protecting email search management system 101 can be scaled as desired. As described above, every client component $101_{CLIENT}$ can receive and process every query across the entire organization. As the number of email users in the organization grows, the query-processing load on each client component $101_{CLIENT}$ grows proportionally. As this search capability becomes more popular within the organization, all client components $101_{CLIENT}$ also become proportionally more loaded. For example, if the number of users doubles, and the number of queries initiated per user per day doubles, then every client 103 has four times the query-processing workload per day. At high scale, the query processing can be offloaded from the clients 103 to a query processing module 305 of the server component $101_{SERVER}$ of the privacy protecting email search management system 101. In this embodiment, the server side query processing module 305 performs query processing on behalf of all (or a subset) of the client components $101_{CLIENT}$ of the privacy protecting email search management system 101. In this scenario, the server side query processing module 305 has a local copy of the indexes, and can compute the search result score for any one of them without requiring any client side processing. In one embodiment, the server component $101_{SERVER}$ builds the indexes on behalf of the client components $101_{CLIENT}$. In another embodiment, the client components $101_{CLIENT}$ build the indexes and upload them to the server component $101_{SERVER}$. In the latter embodiment, content of the emails need not be on the server 105 at any time, which protects against misappropriation if the security of the server side query processing module 305 is ever compromised. In some embodiments, some client components $101_{CLIENT}$ process their indexing and/or search functionality locally, while others can offload some or all of one or both of these functions to the server component $101_{SERVER}$.

FIG. 4 illustrates the operation of a privacy protecting email search management system 101 including a server 105 and a plurality of client computers 103, according to some embodiments. FIG. 4 illustrates a scenario in which query processing for some clients 105 is conducted by a server side query processing module 303. In this example, each of email users A, B, C and D operates a client 103 (i.e., one of clients 103A-D) that includes a privacy protecting email search management system client component $101_{CLIENT}$ to perform client functionality described herein. Each privacy protecting email search management system client component $101_{CLIENT}$ includes at least a tracking and indexing module 301 and a communication module 305. The server 105 in the example includes a privacy protecting email search management system server component $101_{SERVER}$ that performs query processing on behalf of all or some of the client components $101_{CLIENT}$. The server component $101_{SERVER}$ includes a query processing module 303 and a communication module 305.

The tracking and indexing module 301 of each client component $101_{CLIENT}$ builds an index of the emails processed by a corresponding user over time. The client components $101_{CLIENT}$ of email users A, C and D (operating clients 103A, 103C and 103D) push their indexes to the query processing module 303 residing on the server 105, which handles the query processing for clients 103A, 103C and 103D. As these client components $101_{CLIENT}$ build index information, they upload it to the query server side processing module 303 over time. In the example of FIG. 4, the client component $101_{CLIENT}$ on client 103B does not push its index to the query processing module 303, but instead handles query processing locally. As illustrated in FIG. 4, the privacy protecting email search management system $101_{CLIENT}$ on client 103B includes a query processing module 303 for query processing for this purpose.

In this example scenario, email user A creates and submits a query request to the communication module 305 on the server component $101_{SERVER}$. During the normal course of use, the client component $101_{CLIENT}$ on client 103B connects to the server side communication module 305 and receives the query request. The client component $101_{CLIENT}$ on client 103B proceeds to process the query as described above in conjunction with FIG. 3. (e.g., client 103B computes a high search score, prompts user B to indicate whether to respond the query, receives a "no" from user B and ends the processing of the query without sending a response to user A).

By contrast, the query processing module 303 on server 105 receives the query request on behalf of the client components $101_{CLIENT}$ on clients 103C and 103D, which do not receive or process the query request locally. The query processing module 303 on the server 105 computes a low search score by consulting its index from client 103C, and therefore performs no further processing on this request on behalf of client 103C. The query processing module 303 on the server 105 computes a high search score by consulting its index from client 103D. The query processing module 303 passes this result to client 103D through the communication module 305. The client component $101_{CLIENT}$ on client 103D prompts email user D if s/he would like to respond, and email user D indicates "yes." The client component $101_{CLIENT}$ on client 103D sends a response to email user A, through the communication module 305 on server 105. In some embodiments, the client component $101_{CLIENT}$ on client 103D may also send the response directly to email user A based on a connection established using the communication modules 305 on 103A and 103D.

In some environments, email users may have a lower expectation of privacy, especially in the context of emergency response, or state security matters. In such scenarios, an authorized query submitter may compel clients 103 to send a response upon computing a high score without consulting the corresponding user. In such a scenario, it can be desirable for the content data (and not just the metadata) to be present on the server-based query processing module 303. For example, in one embodiment, the query processing module 303 on the server 105 determines a privacy level of a query. When the privacy level meets a criterion (e.g., the privacy level is below a certain level or indicates an emergency query) and the query submitter is an authorized user, the query processing module 303 on the server 105 instructs each responding client 103 with a high search score to generate a response without consulting the corresponding user. For example, if user A in FIG. 4 is an authorized user and the query initiated by user A is emergency based, client 103B could send a response to user A (e.g., through communication module 305 on the server 105) in response to computing a high search score, without prompting to user B.

Many large organizations have a user identity and grouping directory system, in addition to email servers. In some embodiments, the privacy protecting email search management system 101 utilizes such a system to confine queries to those clients 103 that are most likely to be successful in computing a high relevance score in response. For example, a search for engineering expertise could be confined to client components $101_{CLIENT}$ of members of the group "Engineering" in the corporate directory. In the example of FIG. 4, the query processing module 303 on the server 105 could select, from clients 103C and 103D, client 103D as the target for a given query. Such a selection could be based on various factors, for example, previous responding rates for similar queries (e.g., client 103D responded six times and client 103C responded twice for the previous ten queries that had similar search terms), user roles in the organization (e.g., user C is an intern of a given department while user D is a manager), etc.

Figure 5A:
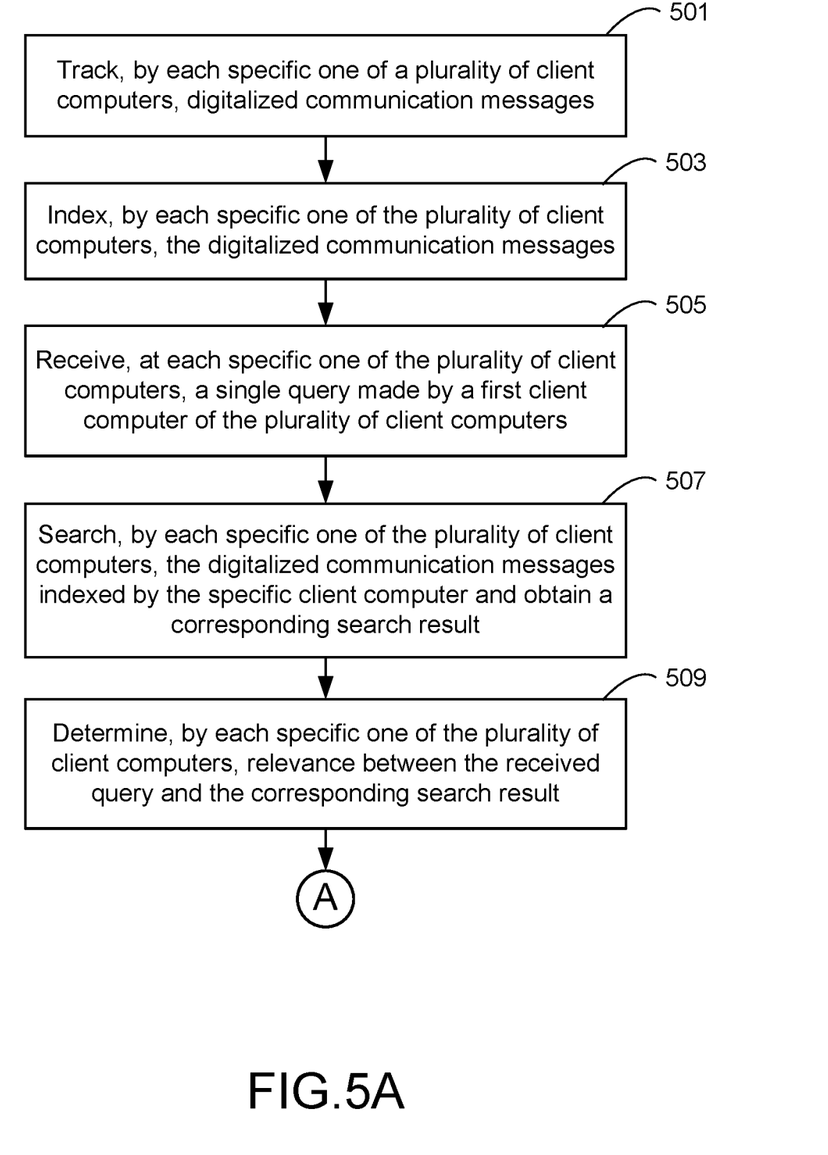
FIGS. 5A and 5B are a flowchart of the operation of a privacy protecting email search management system including a plurality of client computers, according to some embodiments.
Figure 5B:
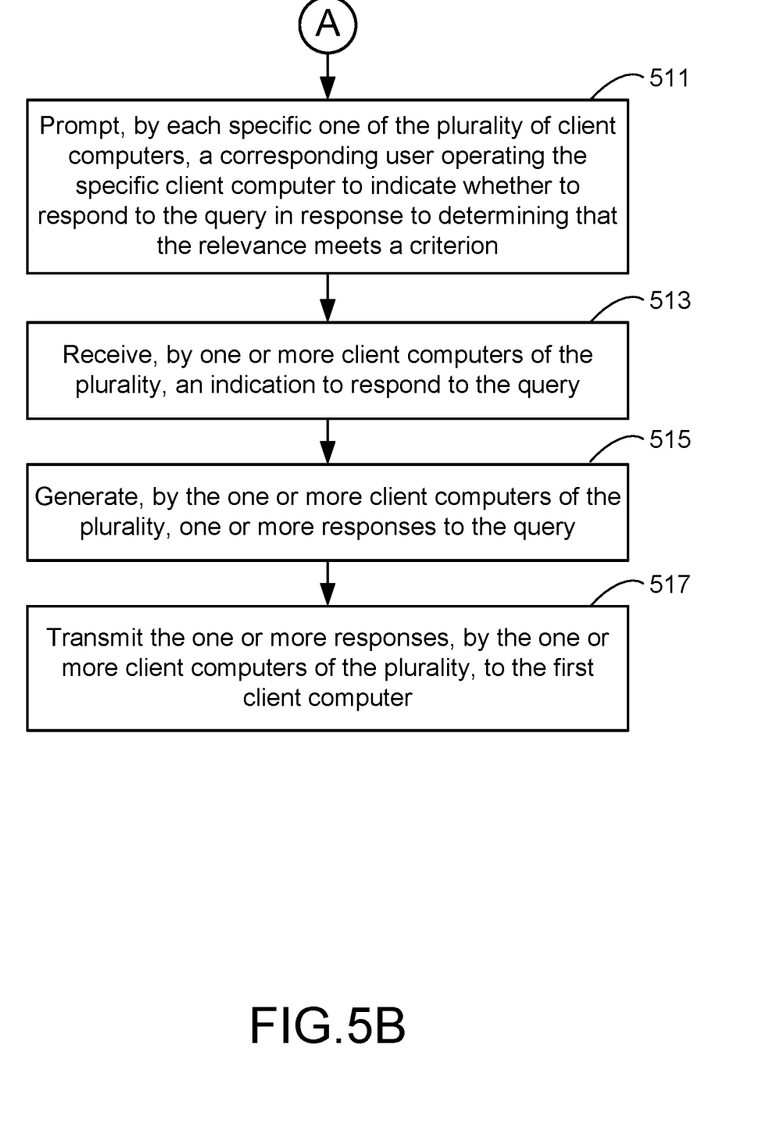

FIGS. 5A and 5B illustrate a flowchart of the operation of a privacy protecting email search management system 101 including a plurality of client computers, according to some embodiments. In FIG. 5A, each specific one of a plurality of client computers 103 tracks 501 digital communication messages, and indexes 503 the tracked digital communication messages. The client computers 103 receive 505 a single query made by a first client computer 103 against the organization's base of digital communication messages. Each client computer 103 searches 507 its indexed digital communication messages, based on the query received from the first client computer 103, and obtains a corresponding search result. The client computers 103 each determine 509 relevance between the received query and the corresponding search result. In some embodiments, determining the relevance further comprises quantifying the relevance of the search result to the query.

Referring now to FIG. 5B, client computers 103 prompt 511 their corresponding users to indicate whether to respond to the query, in response to determining that the relevance meets a criterion. In some embodiments, determining that the relevance meets the criterion further comprises determining that the quantified relevance of the search result to the query meets a threshold. Responsive to the prompting of the corresponding user, one or more client computers 103 of the plurality receive 513 an indication to respond to the query. The client computer(s) 103 generate(s) 515 one or more responses to the query based on corresponding search results, and transmit(s) 517 the generated response(s) to the first client computer 103.

Figure 6A:
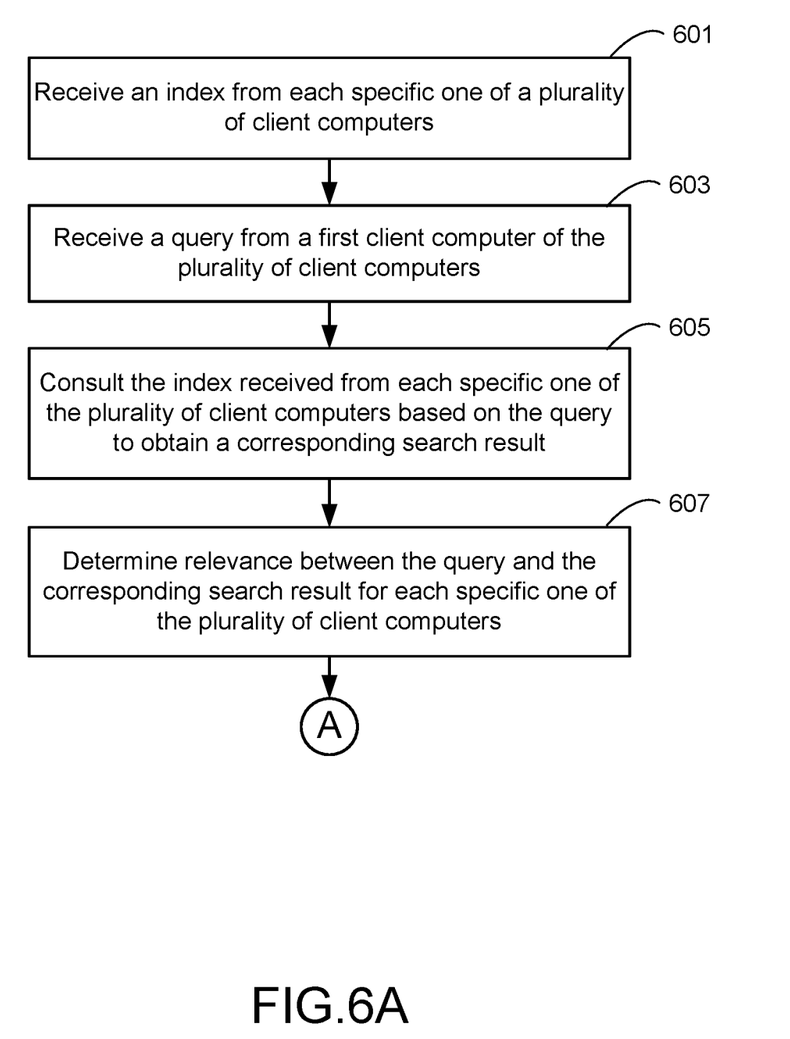
FIGS. 6A and 6B are a flowchart of the operation of a privacy protecting email search management system including a server and a plurality of client computers, according to some embodiments.
Figure 6B:
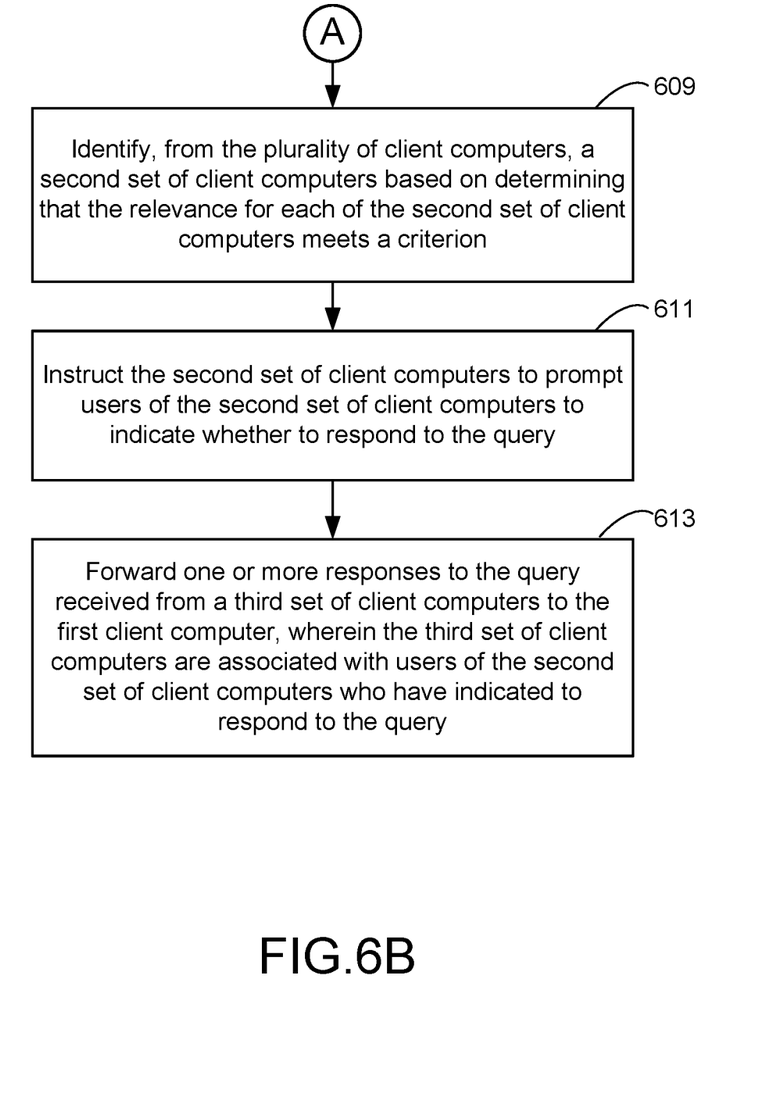

FIGS. 6A and 6B illustrate a flowchart of the operation of a privacy protecting email search management system 101 including a server 105 and a plurality of client computers 103, according to some embodiments. In FIG. 6A, a server 105 receives 601 an index from specific ones of a plurality of client computers 103. Each index corresponds to digital communication messages processed on a corresponding specific one of the plurality of client computers 103. Each one of the plurality of client computers 103 builds an index, and one or more of the clients 103 upload its index to the server 105. The server 105 receives 603 a query from a first client computer 103 of the plurality of client computers 103. The query is against a base of digital communication messages of an organization. The server 105 consults 605 the indexes received from each specific client computer, based on the query, to obtain a corresponding search result. The server 105 determines 607 relevance between the query and the corresponding search result for each specific one of the plurality of client computers 103. In some embodiments, determining the relevance further comprises quantifying the relevance of the search result to the query.

Referring to FIG. 6B, the server identifies 609, from the plurality of client computers 103, a second set of client computers 103 based on determining that the relevance for each of the second set of client computers 103 meets a criterion. In some embodiments, determining that the relevance meets the first criterion further comprises determining that the quantified relevance of the search result to the query meets a threshold. The server 105 instructs 611 the second set of client computers 103 to prompt users of the second set of client computers 103 to indicate whether to respond to the query. The server 105 forwards 613 one or more responses to the query received from a third set of client computers 103 to the first client computer 103. The third set of client computers 103 are associated with those users of the second set of client computers 103 who have indicated to respond to the query. The one or more responses are based on search results of the query on the third set of client computers 103.

As will be understood by those familiar with the art, the subject matter described herein may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the subject matter or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for protecting user privacy when searching digital communication messages within an organization comprising a plurality of client computers, the method comprising the steps of:
   tracking, by each specific one of the plurality of client computers, digital communication messages processed by the specific client computer;
   indexing, by each specific one of the plurality of client computers, the digital communication messages tracked by the specific client computer;
   receiving, at each specific one of the plurality of client computers, a single query made by a first client computer of the plurality of client computers against a base of digital communication messages of the organization;
   searching, by each specific one of the plurality of client computers, the digital communication messages indexed by the specific client computer, based on the query received from the first client computer, and obtaining a corresponding search result;
   determining, by each specific one of the plurality of client computers, relevance between the received query and the corresponding search result, wherein determining the relevance further comprises quantifying the relevance of the search result to the query;
   prompting, by each specific one of the plurality of client computers, a corresponding user operating the specific client computer to indicate whether to respond to the query in response to determining that the relevance meets a criterion, wherein determining that the relevance meets the criterion further comprises determining that the quantified relevance of the search result to the query meets a threshold;
   receiving, by one or more client computers of the plurality, an indication to respond to the query, responsive to the prompting of the corresponding user;
   generating, by the one or more client computers of the plurality, one or more responses to the query based on corresponding search results; and
   transmitting the one or more generated responses, by the one or more client computers of the plurality, to the first client computer.

2. The method of claim 1 wherein generating the one or more responses to the query based on the corresponding search results further comprises:
   determining whether to include identity information of corresponding users operating the one or more client computers in the one or more responses, based on input received from the corresponding users;
   identifying, from the corresponding search results, information to include in the one or more responses; and
   wherein generating the one or more responses is based on the determination and identification.

3. The method of claim 2 wherein the one or more responses are transmitted to the first client computer without exposing the identity information of corresponding users operating the one or more client computers.

4. The method of claim 2 wherein the one or more responses are transmitted to the first client computer with some information of the corresponding search results redacted.

5. The method of claim 1 further comprising:
   receiving, by remaining client computers of the plurality, an indication not to respond to the query, responsive to the prompting of the corresponding user; and
   stopping to respond to the query, by the remaining client computers of the plurality, thereby preventing tracked digital communication messages of the remaining client computers of the plurality from being exposed to the first client computer.

6. The method of claim 1 wherein quantifying the relevance of the search result to the query further comprises:
   computing a relevance score; and
   wherein determining that the quantified relevance of the search result to the query meets the threshold further comprises determining that the relevance score exceeds a threshold score.

7. The method of claim 1 wherein indexing the digital communication messages further comprises:
   creating a keyword-based index based on content of the digital communication messages; and
   wherein the content of the digital communication messages further comprises at least one of a body, an attachment and metadata of the digital communication messages.

8. The method of claim 1 wherein the digital communication messages are from at least one of short messaging service, multimedia messaging service, and email service.

9. The method of claim 1 wherein the single query is a broadcast digital communication message transmitted from the first client computer to the plurality of client computers.

10. The method of claim 1 wherein the single query comprises search terms paired with identity information of a corresponding user operating the first client computer.

11. At least one non-transitory computer readable-storage medium for protecting user privacy when searching digital communication messages within an organization comprising a plurality of client computers, the at least one non-transitory computer readable-storage medium storing computer executable instructions that, when loaded into computer memory and executed by at least one processor of a computing device, cause the computing device to perform the following steps:

tracking, by each specific one of the plurality of client computers, digital communication messages processed by the specific client computer;

indexing, by each specific one of the plurality of client computers, the digital communication messages tracked by the specific client computer;

receiving, at each specific one of the plurality of client computers, a single query made by a first client computer of the plurality of client computers against a base of digital communication messages of the organization;

searching, by each specific one of the plurality of client computers, the digital communication messages indexed by the specific client computer, based on the query received from the first client computer, and obtaining a corresponding search result;

determining, by each specific one of the plurality of client computers, relevance between the received query and the corresponding search result, wherein determining the relevance further comprises quantifying the relevance of the search result to the query;

prompting, by each specific one of the plurality of client computers, a corresponding user operating the specific client computer to indicate whether to respond to the query in response to determining that the relevance meets a criterion, wherein determining that the relevance meets the criterion further comprises determining that the quantified relevance of the search result to the query meets a threshold;

receiving, by one or more client computers of the plurality, an indication to respond to the query, responsive to the prompting of the corresponding user;

generating, by the one or more client computers of the plurality, one or more responses to the query based on corresponding search results; and transmitting the one or more generated responses, by the one or more client computers of the plurality to the first client computer.

* * * * *